Feb. 27, 1968   E. J. WOODBURY ET AL   3,371,265
APPARATUS PRODUCING STIMULATED RAMAN EMISSION
Original Filed Oct. 4, 1962

INVENTORS.
ERIC J. WOODBURY,
GISELA M. ECKHARDT,
BY
James K. Haskell
ATTORNEY

United States Patent Office 3,371,265
Patented Feb. 27, 1968

3,371,265
APPARATUS PRODUCING STIMULATED
RAMAN EMISSION
Eric J. Woodbury, Tarzana, and Gisela M. Eckhardt,
Malibu, Calif., assignors to Hughes Aircraft Company, Culver City, Calif., a corporation of Delaware
Continuation of application Ser. No. 508,632, Oct. 22,
1965, which is a continuation of application Ser. No.
228,343, Oct. 4, 1962. This application Dec. 28, 1966,
Ser. No. 632,117
14 Claims. (Cl. 321—69)

This is a continuation of our application, Serial No. 508,632, filed Oct. 22, 1965, "Apparatus Producing Stimulated Raman Emission," which in turn is a continuation of Ser. No. 228,343, filed Oct. 4, 1962.

This invention relates to a coherent light generator and more particularly to a coherent light generator, including a suitable monochromatic exciting light source, for producing a coherent emission of light energy which is shifted in frequency by a predetermined amount from the frequency of the light energy of the excitation light source.

Prior art coherent light sources each generally comprise a laser cell of fluorescent material which is disposed in an optical resonator and excited by pumping means, generally a broadband light source, to a stationary energy state. This may be explained by indicating that the atoms, or ions as the case may be, of the laser cell material are excited or pumped from what may be called a ground energy level or state to a stationary electronic energy level or state by means of an optical pumping source having the energy corresponding to the difference between the energy represented by the ground energy state and the energy in the region of the aforementioned stationary electronic energy state. The atoms thus excited then decay from the stationary electronic energy state to a lower energy state, or in other cases to the ground energy state, depending on the type of fluorescent material used. In each of the above cases, the atoms decaying from a stationary or metastable electronic energy state to the ground or lower energy state will produce stimulated emission. Thus the prior art provides a mechanism for funneling energy from a broadband incoherent light source into a monochromatic coherent radiation having a discrete frequency. The frequency of the stimulated emission is in every way dependent upon the material comprising the laser cell and, if the cell is made to radiate energy at all, it will always radiate this energy at a frequency characteristic of the material and at no other.

The teachings of the prior art are extended according to the present invention in the utilization of a monochromatic light source to produce coherent light at frequencies shifted a predetermined amount from the frequency of the light energy produced by the exciting light source.

One object of the present invention is to provide an improved coherent light generator.

Another object of the present invention is to provide a coherent light generator capable of radiating coherent light at a frequency shifted a predetermined amount from the frequency of the light energy of an excitation light source.

Still another object of the present invention is to provide a coherent light generator producing one or more frequencies shifted different amounts from the frequency of the excitation light source.

These and other objectives are achieved in a coherent light generator according to one embodiment of this invention comprising a material which is substantially transparent to the frequency of the exciting light energy and which exhibits a Raman effect. According to this invention a material exhibiting a Raman effect is one which may be excited from an initial state by monochromatic light energy to a nonstationary or intermediate energy state different from stationary energy states of the material and which material has a radiative transition from the nonstationary energy state to a Raman active stationary or final energy state which is different from the initial state to thereby produce coherent light energy shifted in frequency a predetermined amount from the frequency of the exciting light energy. The arrangement further includes a monochromatic light source of any suitable type producing exciting light energy passing through the material and exciting the material to said nonstationary energy state.

The elementary principles described above may be practiced in coherent light generators employing two or more materials having differing frequency shift characteristics in response to the frequency of exciting light energy and arranged to be excited from the same source or in cascade wherein the light energy output of one light cell excites the next, etc.

The invention and specific embodiments thereof will be described hereinafter by way of example and with reference to the accompanying drawings, in which.

Figure 1:
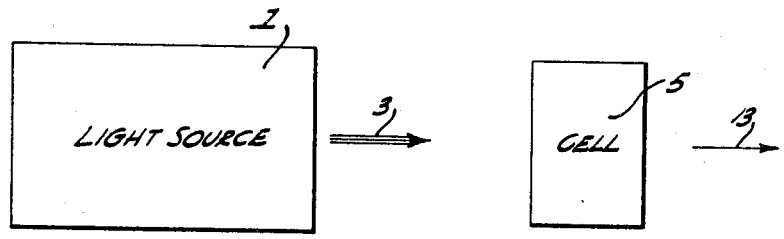
FIGURE 1 is a schematic illustration of a coherent light generator embodying the principles of this invention and having a single cell including a material for producing a predetermined frequency shift in light energy output with respect to the frequency of the exciting light energy.

Referring now to the drawings, and more particularly to the coherent light generator shown in FIG. 1, there is shown a monochromatic light source 1 producing a light beam represented by the arrow 3. The light energy is directed at a frequency converter cell 5 comprising a Raman active material which is substantially transparent to the frequency of the exciting light energy. Coherent light energy shifted in frequency a predetermined amount from the frequency of the exciting light energy produced by the coherent light generator is represented by an arrow 13.

Figure 2:
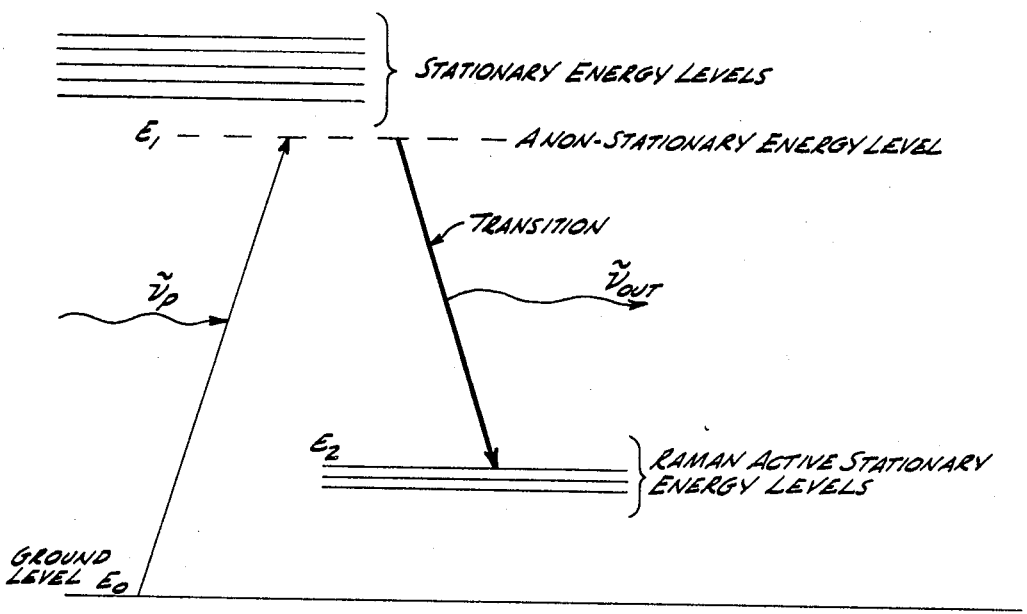
FIG. 2 is a simplified energy state diagram illustrating the effect of a monochromatic light source on Raman active material in accordance with the invention.

The operation of the coherent light generator of the invention may be explained by making reference to the simplified energy state diagram shown in FIG. 2. In FIG. 2, $\tilde{\nu}_\mathrm{P}$ is the wave number of the light energy emitted from the monochromatic light source 1 (FIG. 1). This light energy optically pumps the Raman active material to a nonstationary energy state $E_1 = hc\tilde{\nu}_\mathrm{P}$, where $h$ is Planck's constant and $c$ is the speed of light. From the nonstationary energy level $E_1$ a transition may be said to take place to a Raman active stationary energy level $E_2 = hc\tilde{\nu}_\mathrm{R}$, where $\tilde{\nu}_\mathrm{R}$ is the wave number corresponding to an energy level of the material comprising the cell 5. This transition corresponds to the $n$th harmonic of a Raman active vibration of wave number $\tilde{\nu}_\mathrm{R}$ of the material comprising the cell 5 to thereby produce a different or reduced energy radiation of wave number $$\tilde{\nu}_\mathrm{out} = \frac{E_1 - E_2}{hc}$$

It should be pointed out that the nonstationary energy level $E_1$ is not equal to any stationary energy levels or states of the material. For a further description of nonstationary energy levels or states and Raman active stationary levels attention is directed to "Advances In Spectroscopy," vol. 1, Interscience Publications, Inc., N.Y., 1959, on pages 96 to 102, and authored by B. P. Stoicheff.

The above description made with reference to FIG. 2 distinguishes the operation of the present invention from the prior art devices which utilize fluorescent materials. For example, the energy transition inducing stimulated radiation in the prior art arrangements takes place only between stationary energy levels and not between a nonstationary energy level $E_1$ and a Raman active stationary energy level $E_2$, as is the case in the present invention. It should be noted that prior art devices produce light energy at a frequency dependent upon the fluorescent material used, while the light energy produced by the present invention is dependent both upon the frequency of the exciting light source and the Raman stationary energy levels of the material. That is, as a consequence of the type of operation described in FIG. 2, a stimulated energy emission is generated which is shifted in frequency from the frequency of the exciting light energy by an amount which is in direct correlation with the Raman active stationary energy levels of the particular material used in the coherent light generator of the present invention.

Figure 3:
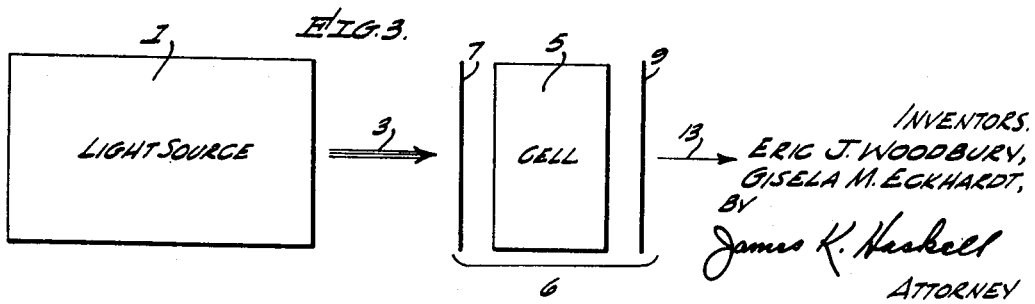
FIGS. 3, 4 and 5 illustrate particular additional single cell embodiments of the present invention incorporating single optical resonators of differing configuration.

An embodiment of the type shown in FIG. 1 is satisfactory in any application where a light source of sufficiently high power is available to provide the required excitation of the material comprising the cell 5. The light power requirement of the source 1 may be reduced in an arrangement as shown in FIG. 3 by disposing the cell 5 in an optical resonator generally designated 6 and comprising reflectors 7 and 9 disposed on opposite sides of the cell in the path of the light energy from the light source 1. The light energy from light source 1 passes through reflector 7 and through the material comprising cell 5 and the resulting stimulated light emission is regenerated by the optical resonator 6.

Figure 4:
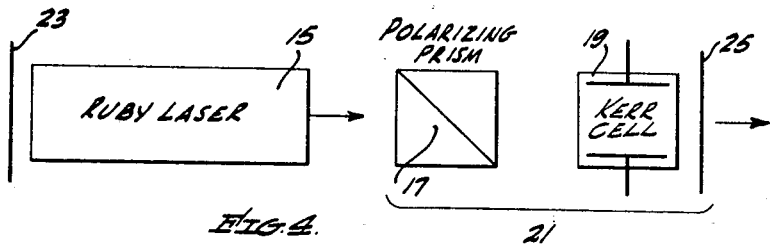

Now making reference to FIG. 4, there is shown a particular arrangement for practicing the present invention utilizing a prior art ruby laser 15, a polarizing prism 17 and a Kerr cell 19. The polarizing prism 17 and the Kerr cell 19 comprise what is known as an optical shutter 21. In accordance with this embodiment, the material exhibiting what is called the Raman effect, i.e., a material having Raman active stationary energy levels, is disposed within the Kerr cell 19, and the light source along with the material exhibiting the Raman effect are included within an optical resonator defined between the reflector 23 and the reflector 25. It may be found to be convenient, although not necessary, to place the Raman active material within the optical resonator utilized in the operation of the ruby laser 15. By placing the ruby laser light source 15 within the optical resonator the efficiency of the system is increased and the light power requirement of the light source is lessened. The ruby laser, the optical shutter and the Kerr cell, being items that are well known in the prior art, are not illustrated in detail herein in the interest of simplicity.

The physical dimensions of the embodiment shown in FIG. 4 may be as follows: a ¼ diameter x 3 inch long cylindrical ruby rod which is polished on all surfaces and which has a 90° C. axis with respect to the longitudinal axis of the cylinder. A Fabry-Perot interferometer or optical resonator formed by external dielectric flats or reflectors 23 and 25 having 99.8% reflectivity and 50% reflectivity respectively. The reflectivity of the reflectors 23 and 25 should vary only slightly over the wavelength region of interest. The optical switching is provided by the Kerr cell 19 and the polarizing prism 17, which may be a Wollaston prism. The lamp energy for exciting the ruby 15 may be supplied from a lamp source (not shown) providing a light pulse having a nearly square shape in time with a duration of about 350 microseconds. The Kerr cell may be adjusted to open 400 microseconds after the initiation of the light pulse. In order to isolate the wanted stimulated radiation from the characteristic emission of the ruby laser of 6943 A. or a wavenumber of 14,400 cm.$^{-1}$, an interference filter (not shown) of 50 A. half width may be utilized at the output. The 6943 A. radiation may be separated by a means of a Wratten 88A low pass filter (not shown). In this embodiment the Raman active material may be an organic compound such as nitrobenzene, for example, in which case a 7670 A. stimulated radiation may be isolated.

Figure 5:
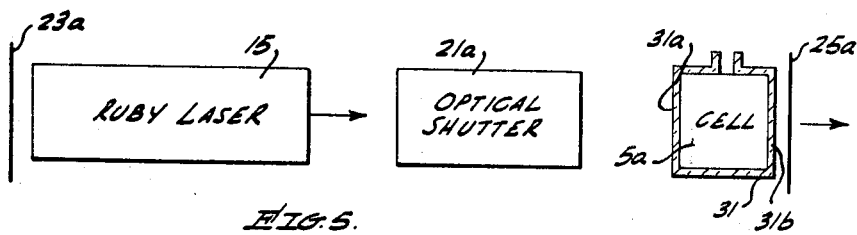

FIG. 5 illustrates a further embodiment of the invention wherein the Raman active material comprises a separate cell 5a which is separate from an optical shutter 21a. Optical shutter 21a may be the same as or different from the optical shutter 21 of FIG. 4. The discussion relating to the cell 5 in FIG. 1 applies equally to the cell 5a. In this embodiment, the coherent light generator includes the ruby laser 15, the optical shutter 21a and the cell 5a comprising the Raman active material. These elements are positioned in a resonant cavity or optical resonator defined between the reflectors 23a and 25a. The coherent light generator according to the invention may comprise apparatus arranged in a linear array of the following components: a multilayer dielectric coated reflecting end plate or reflector 23a, a ⅜ diameter x 3 inch long polished pink ruby cylindrical rod 15 surrounded by a helical flash lamp (not shown), the optical shutter 21a comprising a polarizing Wollaston quartz prism and a KDP Kerr cell, the cell 5a which now comprises a glass cell 31, which may be 2.5, 5 or 10 cm. long, and having optical windows 31a and 31b, in which the Raman active material is disposed, and a partially transmitting multilayer coated reflecting end plate or reflector 25a. With the apparatus as described, the difference between the ruby or R-light wavenumber and the wavenumber of the light from the coherent light generator may be obtained for different Raman active materials as follows:

*Table I*

| Liquid: | Ruby wavenumber minus liquid wavenumbers (cm.$^{-1}$) |
|---|---|
| Benzene | 3064±4 <br> 990±2 <br> 2×(992±2) |
| Nitrobenzene | 1344±2 <br> 2×(1346±2) <br> 3×(1340±5) |
| Toluene | 1004±4 |
| 1-bromonaphthalene | 1368±4 |
| Pyridine | 992±2 <br> 2×(992±5) |
| Cyclohexane | 2852±1 |
| Per-deuterobenzene $C_6D_6$ | 944.3±1 <br> 2×(944±1) |

Figure 6:
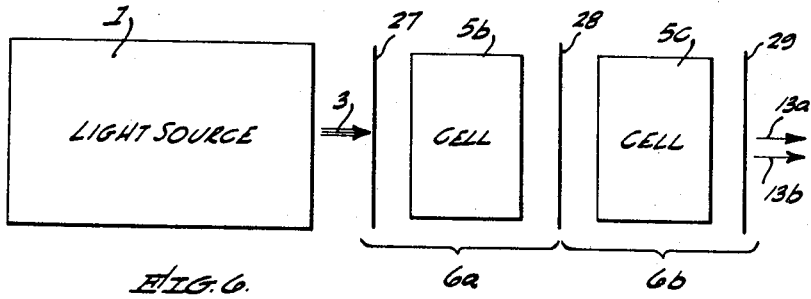
FIGS. 6 and 7 are schematic illustrations of embodiments of the present invention employing more than one cell and more than one optical resonator for producing one or more coherent light radiations.

The use of more than one frequency converter cell providing a multi-stage light generator for the purpose of producing one or more shifted frequency stimulated emission light energy outputs is shown in FIG. 6. As in the case of FIG. 1, the use of a sufficiently high power light source 1 obviates the need for the optical resonators shown. The arrangement illustrated comprises a monochromatic light source 1 producing light beam represented by the arrow 3. The light energy from light source 1 is directed at a first optical resonator 6a defined between reflectors 27 and 28, at a second optical resonator 6b defined between reflectors 28 and 29. Raman active materials are disposed in the optical resonators 6a and 6b. The operation of this embodiment of the invention is basically the same as that described regarding the embodiment shown in FIG. 3, except that the coherent light energy produced by the embodiment of FIG. 6 may now comprise one or more stimulated emissions. Each stimulated emission is at a frequency different from the frequency of the exciting light energy dependent upon the shift in frequency brought about by the individual Raman active materials.

By choosing the proper reflectivities of the several reflectors 27, 28 nd 29, one or more stimulated emissions of light energy represented by arrows 13a and 13b may occur. In fact, the stimulated emissions of light energy may include light energy of the frequency of light source 1, light energy shifted in frequency from light source 1 by an amount determined by frequency converter cell 5b and light energy shifted in frequency by an amount determined by frequency converter cell 5c. The degree of transparency of any reflector to a light beam of a particular frequency is, of course dependent upon the reflected power required of that particular frequency to achieve stimulated emission from a Raman active material of a frequency converter cell in a particular optical resonator.

Figure 7:
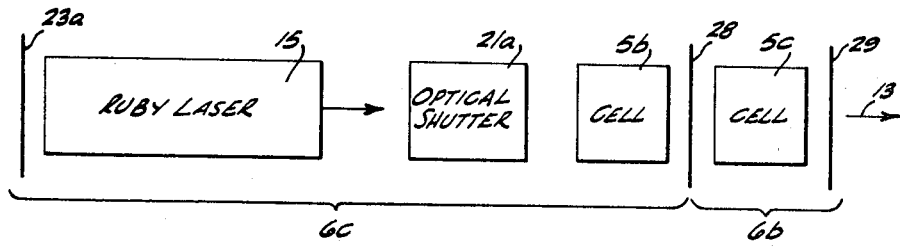

FIG. 7 represents a different arrangement of the general type of coherent light generator shown in FIG. 6. In this illustration, there is shown a ruby laser 15, an optical shutter 21a and a first frequency converter 5b. The foregoing are disposed in a resonant cavity or optical resonator 6c defined between reflectors 23a and 28. A second frequency converter 5c is disposed in a resonant cavity or optical resonator 6b comprised, as before, of reflectors 28 and 29. The inclusion of the light source, now ruby laser 15, in optical resonator 6c is similar in principle to the arrangement in FIG. 4. The function of this multi-stage arrangement is similar to that described in FIG. 6.

From the foregoing it will be seen that frequency conversion is achieved in materials exhibiting a Raman effect by exciting the materials to a nonstationary energy state different from stationary energy states for the material. The stimulated emission resulting from the radiative transition from the nonstationary energy state to a Raman active stationary energy state for the material, is shifted in frequency from the frequency of the exciting light energy by an amount characteristic of the material.

In practicing this invention, any material may be employed exhibiting the frequency conversion characteristics described when excited to a nonstationary energy state. Such materials include by way of illustration but not limited to covalent crystals and compounds and organic compounds. The materials may be a solid, liquid or gas within the general definition of Raman active materials above. Some typical liquids which have been lased have been set forth in Table I above. The invention is not limited to these materials, however.

Reference to light energy herein is intended to embrace the ultraviolet and infrared spectrums in addition to the visible light spectrum.

Although several specific embodiments have been herein illustrated, it will be appreciated that other organizations of the specific arrangements shown may be made within the spirit and scope of the invention. Additionally, other components or elements may be substituted for those which have been particularly named.

Accordingly, it is intended that the foregoing disclosure and the showings made in the drawings shall be considered only as illustrations of the principles of this invention and are not to be construed in a limiting sense.

What is claimed is:

1. Apparatus for producing stimulated Raman emission, comprising in combination: means substantially transparent to monochromatic light and including Raman active material for producing stimulated Raman emission when said material is excited to a nonstationary energy level from which a transition takes place to a Raman active stationary level, and means coupled to said first mentioned means including a source of monochromatic light energy for exciting said material to a nonstationary level.

2. Apparatus for producing stimulated Raman emission, comprising in combination: means including an optical resonator wherein there is disposed Raman active material which is substantially transparent to monochromatic light energy for producing stimulated Raman emission when said material is excited to a nonstationary energy level from which a transition takes place to a Raman active stationary level, and means coupled to said first mentioned means including a source of monochromatic light energy for exciting said material to a nonstationary level.

3. Apparatus for producing stimulated Raman emission, comprising in combination: means including an optical resonator wherein there is disposed Raman active material which is substantially transparent to monochromatic light energy for producing stimulated Raman emission when said material is excited to a nonstationary energy level from which a transition takes place to a Raman active stationary level, and means coupled to said first mentioned means and including an active laser element disposed within said optical resonator for generating monochromatic light energy and exciting said material to a nonstationary level.

4. Apparatus producing stimulated Raman emission, comprising in linear arrangement: a laser for producing monochromatic light energy; a cell containing a Raman active material pyridine which is substantially transparent to the frequency of the exciting light energy from said laser; an optical resonator of the Fabry-Perot interferometer type comprising two dielectric reflectors and spaced in external relationship to said laser and said cell, said resonator providing an output of stimulated Raman emission.

5. Apparatus producing stimulated Raman emission, comprising in linear arrangement: a laser for producing monochromatic light energy; a cell containing a Raman active material nitrobenzene which is substantially transparent to the frequency of the exciting light energy from said laser; an optical resonator of the Fabry-Perot interferometer type comprising two dielectric reflectors and spaced in external relationship to said laser and said cell, said resonator providing an output of stimulated Raman emission.

6. Apparatus producing stimulated Raman emission, comprising in linear arrangement: a laser for producing monochromatic light energy; a cell containing a Raman active material toluene which is substantially transparent to the frequency of the exciting light energy from said laser; an optical resonator of the Fabry-Perot interferometer type comprising two dielectric reflectors and spaced in external relationship to said laser and said cell, said resonator providing an output of stimulated Raman emission.

7. Apparatus producing stimulated Raman emission, comprising in linear arrangement: a laser for producing monochromatic light energy; a cell containing a Raman active material 1-bromonaphthalene which is substantially transparent to the frequency of the exciting light energy from said laser; an optical resonator of the Fabry-Perot interferometer type comprising two dielectric reflectors and spaced in external relationship to said laser and said cell, said resonator providing an output of stimulated Raman emission.

8. Apparatus producing stimulated Raman emission, comprising in linear arrangement: a laser for producing monochromatic light energy; a cell containing a Raman active material cyclohexane which is substantially transparent to the frequency of the exciting light energy from said laser; an optical resonator of the Fabry-Perot interferometer type comprising two dielectric reflectors and spaced in external relationship to said laser and said cell, said resonator providing an output of stimulated Raman emission.

9. Apparatus producing stimulated Raman emission, comprising in linear arrangement: a laser for producing monochromatic light energy; a cell containing a Raman active material per-deuterobenzene which is substantially transparent to the frequency of the exciting light energy from said laser; an optical resonator of the Fabry-Perot interferometer type comprising two dielectric reflectors and spaced in external relationship to said laser and said cell, said resonator providing an output of stimulated Raman emission.

10. Apparatus for producing stimulated Raman emission, comprising: a laser for producing monochromatic light energy; first means optically coupled to said laser and including a Raman active material which is excited by and substantially transparent to said monochromatic light energy for producing stimulated Raman emission of a frequency dependent upon the particular Raman active material utilized in said first means; and second means optically coupled to said first means and including a Raman active material which is excited by and substantially transparent to said stimulated Raman emission produced by said first means for producing stimulated Raman emission of a frequency different than that of said first mentioned Raman emission and which is dependent upon the particular Raman active material utilized in said second means.

11. Apparatus for producing stimulated Raman emission, comprising in combination: an optical resonator having at least a pair of spaced parallel partially reflective end surfaces, a cell containing a Raman active material disposed between said reflective end surfaces, said material being substantially transparent to monochromatic light energy used to produce stimulated Raman emission in said material, a source of monochromatic coherent light optically coupled to said Raman active material and of sufficient intensity to excite said material to a Raman active nonstationary energy level to thereby produce stimulated Raman emission from said Raman active material.

12. Apparatus for producing stimulated Raman emission, comprising in combination: means substantially transparent to monochromatic light and including Raman active material, and means coupled to said first mentioned means for producing monochromatic light energy to establish an energy transition between non-stationary and stationary energy levels in said Raman active material whereby coherent light of a frequency different from that of said monochromatic light energy is emitted.

13. Apparatus for producing stimulated Raman emission, comprising in combination: means for producing a beam of monochromatic light along a predetermined linear optical axis, and means including Raman active material which is substantially transparent to said monochromatic light and optically coupled to said first mentioned means for producing stimulated Raman emission of a frequency different from that of said monochromatic light and in a direction substantially parallel to said predetermined optical axis.

14. Apparatus for producing stimulated Raman emission, comprising in combination: means transparent to monochromatic light and including Raman active material for producing coherent Raman emission when said material is excited to an energy level and from which a radiative transition to a different energy level takes place, and means coupled to said first mentioned means including a source of monochromatic light energy for exciting said Raman active material to said energy level from which said radiative transition to a different energy level takes place thereby producing coherent Raman emission.

References Cited

Porto et al.: "Journal of the Optical Society of America," March 1962, pp. 251–252.

Bloembergen et al.: "Physical Review Letters," May 4, 1964, pp. 508–507.

Kaminow: "IEEE Spectrum," April 1965, pp. 35–43.

Townes et al.: "Physical Review Letters," May 25, 1964, pp. 592–595.

ROY LAKE, *Primary Examiner.*

D. R. HOSTETTER, *Assistant Examiner.*